(12) United States Patent
Xue et al.

(10) Patent No.: US 11,319,761 B2
(45) Date of Patent: May 3, 2022

(54) STOCHASTIC CONTROL METHOD FOR MUD CIRCULATION SYSTEM

(71) Applicant: Halliburton Energy Services, Inc., Houston, TX (US)

(72) Inventors: Yuzhen Xue, Humble, TX (US); Jason D. Dykstra, Spring, TX (US); Xiaoqing Ge, The Woodlands, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 147 days.

(21) Appl. No.: 16/923,691

(22) Filed: Jul. 8, 2020

(65) Prior Publication Data

US 2020/0340311 A1    Oct. 29, 2020

Related U.S. Application Data

(63) Continuation of application No. 15/776,757, filed as application No. PCT/US2016/015651 on Jan. 29, 2016, now Pat. No. 10,738,548.

(51) Int. Cl.
| | |
|---|---|
| *E21B 21/08* | (2006.01) |
| *E21B 21/01* | (2006.01) |
| *E21B 21/06* | (2006.01) |
| *G05B 17/02* | (2006.01) |

(52) U.S. Cl.
CPC ............ *E21B 21/01* (2013.01); *E21B 21/06* (2013.01); *E21B 21/08* (2013.01); *G05B 17/02* (2013.01); *E21B 21/062* (2013.01); *E21B 21/065* (2013.01); *E21B 21/067* (2013.01)

(58) Field of Classification Search
CPC ................................. E21B 21/08; E21B 44/00
See application file for complete search history.

(56) References Cited

U.S. PATENT DOCUMENTS

| | | |
|---|---|---|
| 3,971,926 A | 7/1976 | Gau et al. |
| 5,140,527 A | 8/1992 | Jones et al. |
| 8,517,692 B2 | 8/2013 | Hopwood et al. |
| 8,567,525 B2 | 10/2013 | Reitsma |

(Continued)

FOREIGN PATENT DOCUMENTS

WO    2011095600 A2    8/2011

OTHER PUBLICATIONS

International Search Report and Written Opinion for PCT/US2016/0156561 dated Oct. 21, 2016.

*Primary Examiner* — Shane Bomar
(74) *Attorney, Agent, or Firm* — DeLizio, Peacock, Lewin & Guerra

(57) ABSTRACT

A stochastic control method includes determining a property of a solid present in a drilling fluid circulating within a mud circulation system and identifying a mud circulation model that dictates operation of the mud circulation system. The mud circulation model is based on one or more models of one or more uncertainties encountered during a wellbore drilling operation. The method further includes determining an accuracy of the mud circulation model based on a difference between the determined property of the solid present in the drilling fluid and a solid property of the drilling fluid as provided by the mud circulation model, and programming a controller of the mud circulation system based on the mud circulation model to modify operation of the mud circulation system.

20 Claims, 8 Drawing Sheets

(56) References Cited

U.S. PATENT DOCUMENTS

| | | |
|---|---|---|
| 8,818,779 B2 | 8/2014 | Sadlier et al. |
| 2009/0194330 A1 | 8/2009 | Gray |
| 2010/0274546 A1 | 10/2010 | Zafari et al. |
| 2011/0024195 A1 | 2/2011 | Hoyer et al. |
| 2013/0008647 A1 | 1/2013 | Dirksen et al. |
| 2013/0049983 A1 | 2/2013 | Rasmus et al. |
| 2013/0133948 A1 | 5/2013 | Lovorn |
| 2016/0290118 A1* | 10/2016 | Xue ................. E21B 47/12 |
| 2016/0314420 A1 | 10/2016 | Livescu et al. |
| 2017/0098020 A1 | 4/2017 | Samuel et al. |
| 2017/0198536 A1 | 7/2017 | Song et al. |
| 2017/0198553 A1* | 7/2017 | Dykstra ........... E21B 41/0092 |
| 2017/0204689 A1 | 7/2017 | Dykstra et al. |
| 2017/0211954 A1 | 7/2017 | Dykstra et al. |
| 2017/0328154 A1 | 11/2017 | Song et al. |
| 2017/0328191 A1 | 11/2017 | Wessling et al. |
| 2018/0051558 A1 | 2/2018 | Erdmann et al. |
| 2018/0156023 A1* | 6/2018 | Dykstra ............. E21B 44/00 |
| 2019/0227048 A1 | 7/2019 | Ye et al. |

\* cited by examiner

STOCHASTIC CONTROL METHOD FOR MUD CIRCULATION SYSTEM

CROSS-REFERENCE TO RELATED APPLICATIONS

This application is a continuation of and claims priority to U.S. patent application Ser. No. 15/776,757 filed on May 16, 2018, published as U.S. Patent Application Publication No. 2018/0347298 A1, and entitled "STOCHASTIC CONTROL METHOD FOR MUD CIRCULATION SYSTEM," by Yuzhen Xue et al, which is a U.S. National Stage application under 35 U.S.C. § 371 and claims the benefit of priority to International Patent Application No. PCT/US2016/015651, filed Jan. 29, 2016.

BACKGROUND

During a wellbore drilling operation, drilling fluid or "mud" is circulated through a mud circulation system. Typically, the mud flows down a drill string to a rotating drill bit, which is suspended in a borehole. The mud flows through to the drill bit and exits through openings in the drill bit. As the mud exits, it flushes drill cuttings generated away from the drill bit. Then, the mud flows up an annular space between the drill string and the wall of the borehole, carrying the drill cuttings to the surface.

A mud circulation system controller controls operation of the mud circulation system in a desired manner using one or more steady state or dynamic models. However, the drilling environment and the drilling process often affect the performance of the steady state or dynamic models and, as a result, the performance of the mud circulation system can deviate from an expected (or designed) performance.

BRIEF DESCRIPTION OF THE DRAWINGS

The following figures are included to illustrate certain aspects of the present disclosure and should not be viewed as exclusive embodiments. The subject matter disclosed is capable of considerable modifications, alterations, combinations, and equivalents in form and function, without departing from the scope of this disclosure.

DETAILED DESCRIPTION

The present disclosure is related to a stochastic control method for a mud circulation system. Embodiments disclosed effectively regulate the fluid property of a mud circulation system subject to various uncertainties.

According to embodiments described herein the steady state/dynamic mud circulation models of a mud circulation system, as well as the controller design, are adaptively updated so that the mud circulation models closely represent the mud circulation system. The stochastic control design reduces the impact of various process and model uncertainties on the mud circulation system. With a designed controller, the mud circulation system will perform more efficiently, in spite of its uncertainty-induced difference from the model.

Mud circulation systems used in drilling wellbores are subject to various uncertainties including sensing uncertainty, actuator uncertainty, model uncertainty and physical disturbance uncertainty. The sensing uncertainties may originate from the time delay in viscosity measurements or downhole temperature measurements, and the inaccuracy in the density measurement of the non-homogeneous mud flow. The actuator uncertainty may be due to the coarse weighting material dosing system and the capacity constraints of the mud pumping system. The mud circulation dynamics model and the static model, such as the equivalent circulating density (ECD) calculation model, may contribute to the model uncertainty. The physical disturbance uncertainty may be generated by the drill string-borehole interaction, bit-rock interaction, or the like.

These uncertainties cause the operation of the mud circulation system to deviate from a nominal system. As used herein, a "nominal system" refers to a system that is user-designed and which exhibits a desired behavior and produces known (or expected) outputs. When a controller designed for the nominal system is implemented to the real mud circulation system, it may lead to unstable behavior and put the well in risk. The stochastic control methods disclosed herein improve the performance of the mud circulation system, in spite of the aforementioned uncertainties.

Figure 1A:
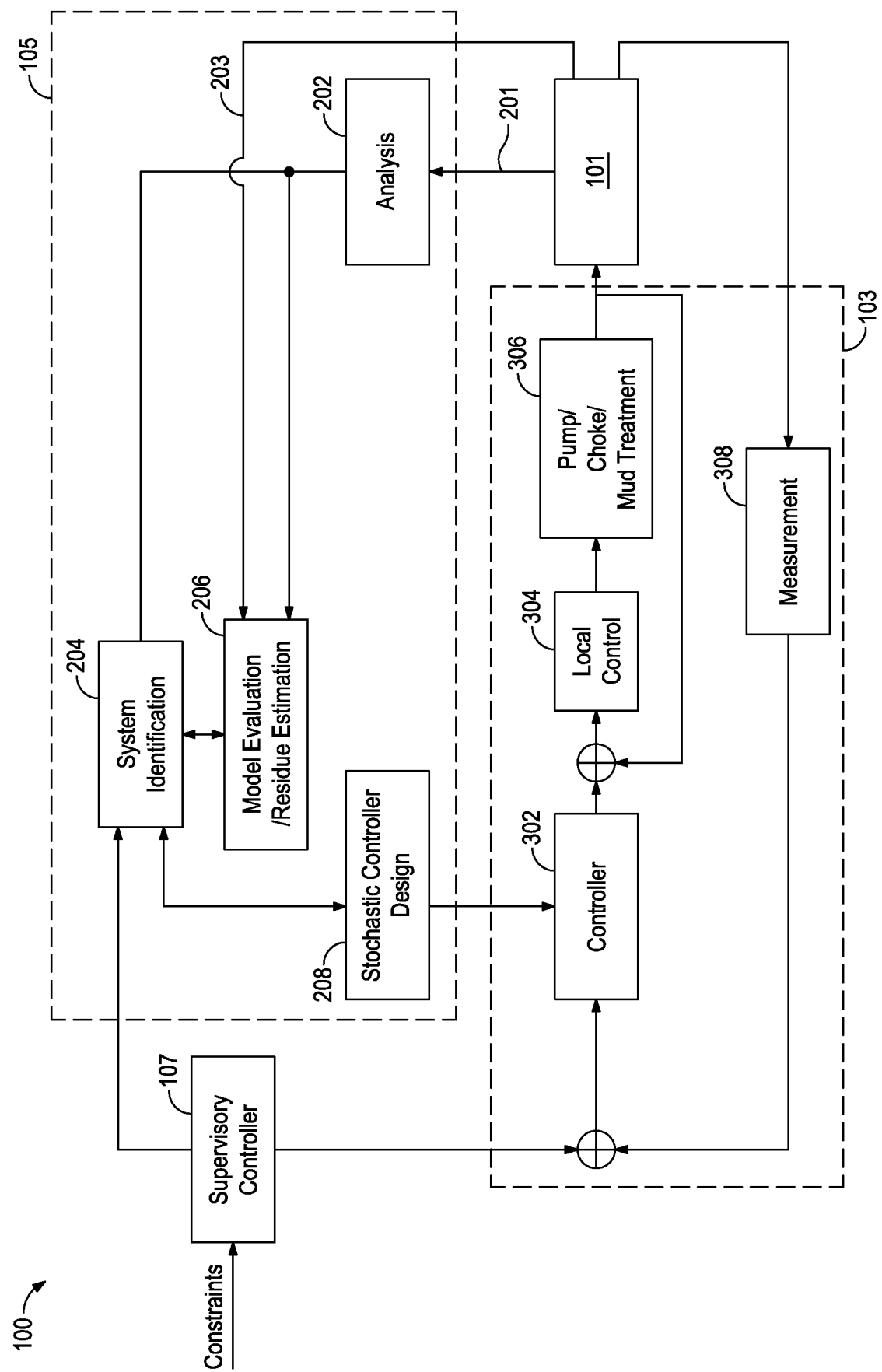
FIG. 1A illustrates a schematic diagram of a well system that can employ the principles of the present disclosure.

FIG. 1A illustrates a schematic diagram of an exemplary system 100 that may incorporate the principles of the present disclosure. The system 100 includes a wellbore drilling assembly 101, a primary controller 103, a secondary controller 105, and a supervisory controller 107. As described herein, the primary controller 103 is a stochastic controller operating based on the Randomized Algorithm (RA) method for controlling the overall operation of the wellbore drilling assembly 101 and, particularly, the operation of a mud circulation system used in the wellbore drilling assembly 101. However, the primary controller 103 may operate based on other techniques such as Stochastic Model Predictive Control (SMPC) or the like, without departing from the scope of the disclosure.

The secondary controller 105 is configured to reconstruct/reprogram the primary controller 103 when the performance of the mud circulation system deviates from normal or designed operational requirements. Specifically, the secondary controller 105 monitors or "supervises" the operation of the primary controller 103 and functions to reprogram the primary controller 103 when the outputs of the mud circulation model used in the mud circulation system deviate from a desired tolerance range, thereby minimizing improper wellbore operations. It will thus be understood that, when the mud circulation model outputs within the desired tolerance range, the secondary controller 105 is "cut-off" from the system 100, and the primary controller 103 and/or the supervisory controller 107 coordinate (regulate) the operations of the mud circulation system.

Figure 1B:
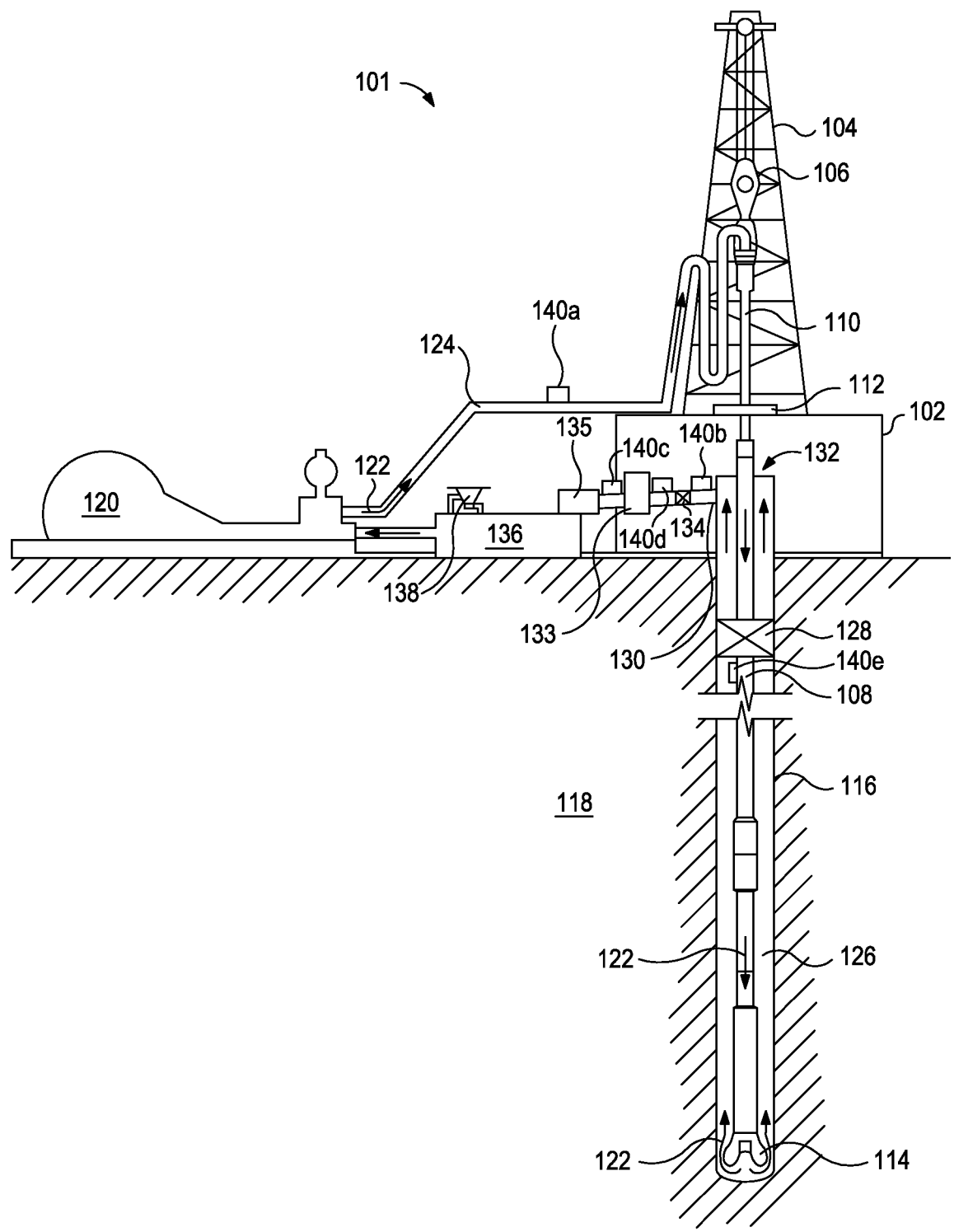
FIG. 1B illustrates an exemplary wellbore drilling assembly of FIG. 1A.

FIG. 1B is a schematic diagram of an exemplary wellbore drilling assembly 101. The wellbore drilling assembly 101 may include a drilling platform 102 that supports a derrick 104 having a traveling block 106 for raising and lowering a drill string 108. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a borehole 116 that penetrates various subterranean formations 118.

A pump 120 (e.g., a mud pump of the mud circulation system) circulates drilling fluid 122 ("mud") through a feed pipe 124 and to the kelly 110, which conveys the drilling fluid 122 downhole through an interior conduit defined in the drill string 108 and through one or more orifices in the drill bit 114. The drilling fluid 122 is then circulated back to the surface via an annulus 126 defined between the drill string 108 and the walls of the borehole 116. The drilling fluid 122 provides hydrostatic pressure to prevent formation fluids from entering into the borehole 116 and keeps the drill bit 114 cool and clean during drilling. The drilling fluid 122 also serves to carry drill cuttings and solids out of the borehole 116 and suspend the drill cuttings and solids while drilling is paused and/or when the drill bit 114 is brought in and out of the borehole 116.

As the spent drilling fluid 122 returns to the surface, it may pass through one or more wellbore choke valves 128 (one shown) arranged generally within the annulus 126. The wellbore choke valves 128 may be used to reduce and otherwise regulate the fluid pressure of the spent drilling fluid 122 as it is conveyed to the surface for processing and recirculation.

At the surface, the spent drilling fluid 122 exits the annulus 126 at the wellhead 132 and subsequently passes through one or more surface choke valves 134 (one shown) via an interconnecting flow line 130. The surface choke valve 134 may be used to maintain or otherwise regulate the pressure on the annulus 126 at surface, for example in the range of about 100 psi to about 300 psi. As a result, this will enable drilling to continue underbalanced and is useful in reducing formation 118 damage to the reservoir, but also to facilitate increased drilling speed.

Following the surface choke valve 134, the spent drilling fluid 122 may be conveyed to one or more drilling fluid rehabilitation devices via the interconnecting flow line 130. Such drilling fluid rehabilitation devices may include, but are not limited to, one or more degassing units 133 and one or more solids control equipment 135. The degassing unit 133 may be any device or machine configured to separate from the drilling fluid 122 any gases (i.e., hydrocarbon and non-hydrocarbon gas species) that may have been entrained in the drilling fluid 122 while circulating in and out of the borehole 116. The solids control equipment 135 may be configured to substantially remove the drill cuttings and solids from the drilling fluid 122 and deposit a "cleaned" drilling fluid 122 into a nearby retention pit 136 (i.e., a mud pit).

Several additives or components may be added to the drilling fluid 122 in order to maintain the drilling fluid 122 in proper working order and otherwise enhance drilling capabilities. In some embodiments, the additives and components may be added to the drilling fluid 122 via a mixing hopper 138 coupled to or otherwise in communication with the retention pit 136. Exemplary components that may be added to the drilling fluid 122 include, but are not limited to, emulsions, weighting materials, viscosifiers, thickeners, rheology modifiers, thinners, deflocculants, anionic polyelectrolytes (e.g., acrylates, polyphosphates, lignosulfonates, tannic acid derivates, etc.), high-heat polymers, clay stabilizers, clay inhibitors, tar treatments, water and other base fluids, combinations thereof, and the like. The rehabilitated drilling fluid 122 may then be recirculated and pumped back into the borehole 116 with the pump 120 via the feed pipe 124.

The spent drilling fluid 122 returning to the surface may be analyzed to determine its fluid properties such as the pressure, density and/or viscosity, type and/or concentration of one or more gases present therein, or any other desired properties of the drilling fluid 122. Additionally, rock properties such as the rock ingredients and the chip weights of the drill cuttings and solids exiting the borehole 116 may also be analyzed. In order to perform the analysis, the drilling fluid 122 is sampled or otherwise analyzed at various locations 140 (shown as locations 140a, 140b, 140c, 140d, and 140e) throughout the fluid circuit of the drilling assembly 101. The data obtained by the sensors or measurement devices at each location 140a-e are then provided to the secondary controller 105 (FIG. 1A) in or near real-time, or at desired time intervals. The sensors or measurement devices may be included in Logging While Drilling (LWD) or Measurement While Drilling (MWD) tools but could alternatively comprise any sensor configured to measure physical and/or chemical characteristics or parameters of the drilling fluid 122.

Referring again to FIG. 1A, with continued reference to FIG. 1B, the secondary controller 105 includes an analysis module 202, a system identification module 204, a model evaluation/residue estimation module 206, and a stochastic controller design module 208. The analysis module 202 may comprise or include one or more devices that analyze the data obtained by the sensors or measurement devices at each location 140a-e (FIG. 1B). Additionally, or alternatively, the analysis may be performed by an operator of the drilling assembly 101. The drilling fluid 122 data measured by the sensors or measurement devices from one or more downhole locations, such as location 140e (FIG. 1B), may be provided to the analysis module 202, as generally indicated at 201, while the drilling fluid 122 data from the one or more surface locations, such as locations 140a-d (FIG. 1B), may be provided directly to the model evaluation/residue estimation module 206, as generally indicated at 203. While the drilling fluid 122 data obtained at the downhole locations 140e may be analyzed using the analysis module 202, the drilling fluid 122 data obtained at the surface locations 140a-d may also be analyzed using one or more desired analysis devices, such as the analysis module 202. The results from the analysis module 202 are provided to the model evaluation/residue estimation module 206 and the system identification module 204.

The system identification module 204 is communicably coupled to the analysis module 202 and identifies the one or more mud circulation models that dictate an operation of the mud circulation system of the wellbore drilling assembly 101. As an example, the mud circulation models may be or include desired first principle models or data driven models, which may be linear or nonlinear. The system identification module 204 may identify the models used based on either the gray box or black box methods. In the gray box method, a physical model is pre-defined while the model parameters are identified during wellbore operation. In the black box methods, the model is derived purely from the measurement data. Usually the identified model is in a relatively simple form that may be beneficial for controlling the mud circulation system.

As the wellbore operations progress, the performance of the actual mud circulation system may drift away from the identified mud circulation model. As mentioned before, this may be due to various uncertainties including sensing uncertainty, actuator uncertainty, model uncertainty, and physical disturbances. If these uncertainties (and other disturbances that may affect the performance of the actual mud circulation system) are not considered in the design or configuration of the primary controller 103, then these uncertainties may adversely affect the wellbore operations.

In order to minimize the impact of the aforementioned uncertainties, models of the uncertainties may be created, and the mud circulation system is then operated using the modelled uncertainties. In an example, the uncertainties are modeled based on their statistical properties. The statistical properties can be derived from the manufacturing data of the equipment used in the wellbore drilling assembly 101, the empirical data/historical data obtained from the mud circulation system, and/or the real-time measurement data obtained from the mud circulation system. For example, the uncertainty from a density sensor can be modeled as a Gaussian random variable with certain bias and variance or the bit-rock interaction statistics can be modeled according to the probabilities of the occurrences of bit stick-slip versus regular bit rotation.

The model evaluation/residue estimation module 206 is communicably coupled to the analysis module 202 and the system identification module 204 and is configured to evaluate the accuracy of the mud circulation model currently used to operate the mud circulation system. If a difference (or residue) between the fluid properties of the spent drilling fluid 122 as measured and the outputs of the mud circulation model currently being used exceeds or indicates a trend to exceed the currently assumed uncertainty level (a predetermined threshold value), the system identification module 204 recalculates/updates the mud circulation model and operates the mud circulation system using the updated mud circulation model. Otherwise, when the difference is within the currently assumed uncertainty level, the currently used model is maintained.

Whether or not the mud circulation model currently used to operate the mud circulation system satisfactorily represents the mud circulation system can be justified by statistical test methods. For instance, for a given current system model and a desired Gaussian uncertainty distribution of $N(\mu, \sigma)$ (where $\mu$ represents the mean or expectation of the distribution and $\sigma$ represents the standard deviation of the distribution), when over 10% data lies out of $2\sigma$ of the mean, the model is determined to be ineffective and the system identification module 204 recalculates a new mud circulation model to be used to operate the mud circulation system. As the wellbore operations progress, the historical difference (or residue) estimation may also be used to refine the system's uncertainty distribution assumption and thus improve the effectiveness of the secondary controller 105 in recalculating a new mud circulation model for the mud circulation system.

The difference threshold that triggers the model update is associated with various factors. For instance, one of the factors may be drilling relevant, wherein when drilling is performed through a formation with a relatively narrow pressure window (e.g., for drilling operations), the difference threshold needs to be small so that the model is updated more frequently. Another factor is controller relevant, wherein the range of uncertainties permitted for operating the mud circulation system is such that the controller can operate while satisfying the mud circulation specifications.

The stochastic controller design module 208 is communicably coupled to the system identification module 204 and designs a controller based on the new mud circulation model identified by the system identification module 204. As an example, and for the purposes of discussion herein, it is assumed that the primary controller 103 operates based on a Randomized Algorithm (RA) method, although other techniques such as Stochastic Model Predictive Control (SMPC) or the like may also be used without departing from the scope of the disclosure. The stochastic controller design module 208 may then design a controller with the RA method based on a new mud circulation model and program the newly designed controller into the primary controller 103 for controlling the operations of the mud circulation system. When designing the controller, the stochastic controller design module 208 also considers various uncertainty models in the controller design. The sampled models (each sampled model including the new mud circulation model combined with an uncertainty model) are drawn according to the statistical distributions and the primary controller 103 is statistically optimized by the stochastic controller design module 208 for operating the wellbore drilling assembly 101 (FIG. 1B) and its associated mud circulation system. The primary controller 103 can thus be designed either to guarantee a desired performance with a priori specified probability or to ensure a desired performance of the wellbore drilling assembly 101.

The primary controller 103 includes a programmable controller 302 (an RA controller, in this case), which is programmed or designed by the stochastic controller design module 208 with the new mud circulation model identified by the system identification module 204. The controller 302 is implemented in real-time to regulate the fluid properties of the drilling fluid 122. The supervisory controller 107 (which is superordinate to the primary controller 103 and the secondary controller 105) is communicably coupled to the system identification module 204 and calculates the optimal values of fluid (mud) properties (e.g., the desired fluid density, viscosity, and flow rate) based on various constraints including, but not limited to, pressure constraints (e.g., pressure to be maintained in the wellbore during operation), path constraints (e.g., the wellbore trajectory), and operational constraints of one or more components of the mud circulation system (e.g., the mud pump 120, choke valves 128, etc.) for safe and efficient mud circulation.

Comparing the desired fluid properties provided by the supervisory controller 107 and the measured values of the fluid properties obtained from the analysis module 202, the controller 302 calculates the control commands for controlling the different components of the mud circulation system. The different components of the mud circulation system may include, for example, the mud pump 120, choke valves 128, any mud treatment devices, and any desired component, and are generally represented as 306 in FIG. 1A. As depicted, the control commands may be provided to the different components via one or more local controllers 304 that may control the operations of individual components. The primary controller 103 may also include a measurement module 308 that measures the fluid properties (e.g., the desired fluid density, viscosity, and flow rate) of the drilling fluid 122, which are then compared with the desired optimal mud properties provided by the supervisory controller 107. The result of comparison is then provided to the controller 302, which may then update/revise the control commands for the components of the mud circulation system.

It should be noted that, because the uncertainties that may be experienced by the wellbore drilling assembly 101 and the mud circulation system are already considered by the stochastic controller design module 208 when programming the primary controller 103 with a new mud circulation model, the control commands from the primary controller 103 can regulate the wellbore drilling assembly 101 and the mud circulation system more efficiently.

Figure 2A:
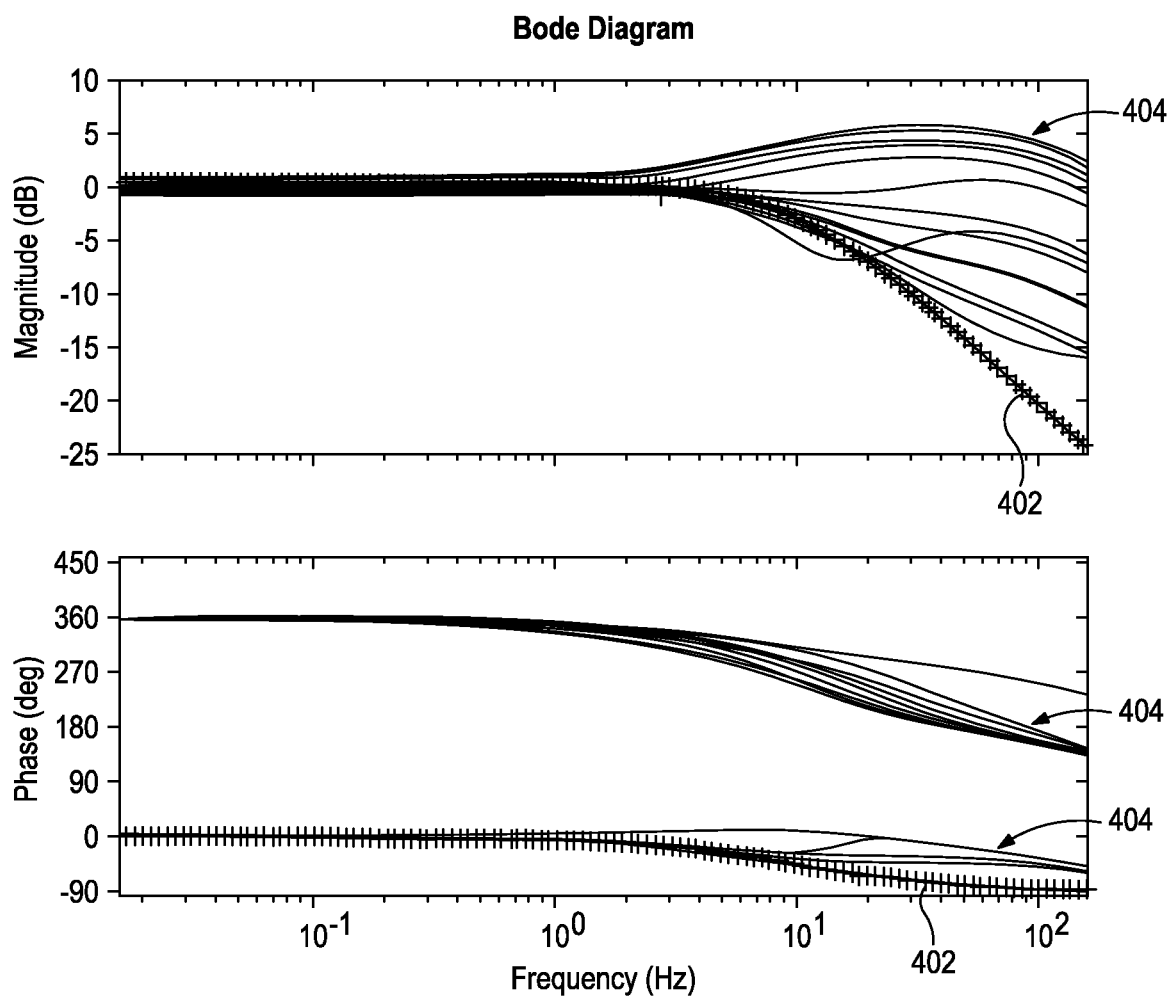
FIG. 2A illustrates a bode plot of transfer functions of the plurality of sampled models of a system subjected to one or more uncertainties.

FIGS. 2A-2D illustrate exemplary plots of a plurality of sampled models and a nominal system. Each sampled model is obtained from a mud circulation model and a designed uncertainty model. The plots demonstrate the benefits and advantages of the exemplary stochastic control method disclosed above. FIG. 2A illustrates a bode plot of transfer functions of the plurality of sampled models of a system subjected to one or more uncertainties. The sampled models are generated within a predefined uncertainty bound from the nominal system (represented by curve 402 in the magnitude and phase plots). As illustrated, the sampled models (collectively represented by the curves 404) show large variations compared to the nominal system data 402.

Figure 2B:
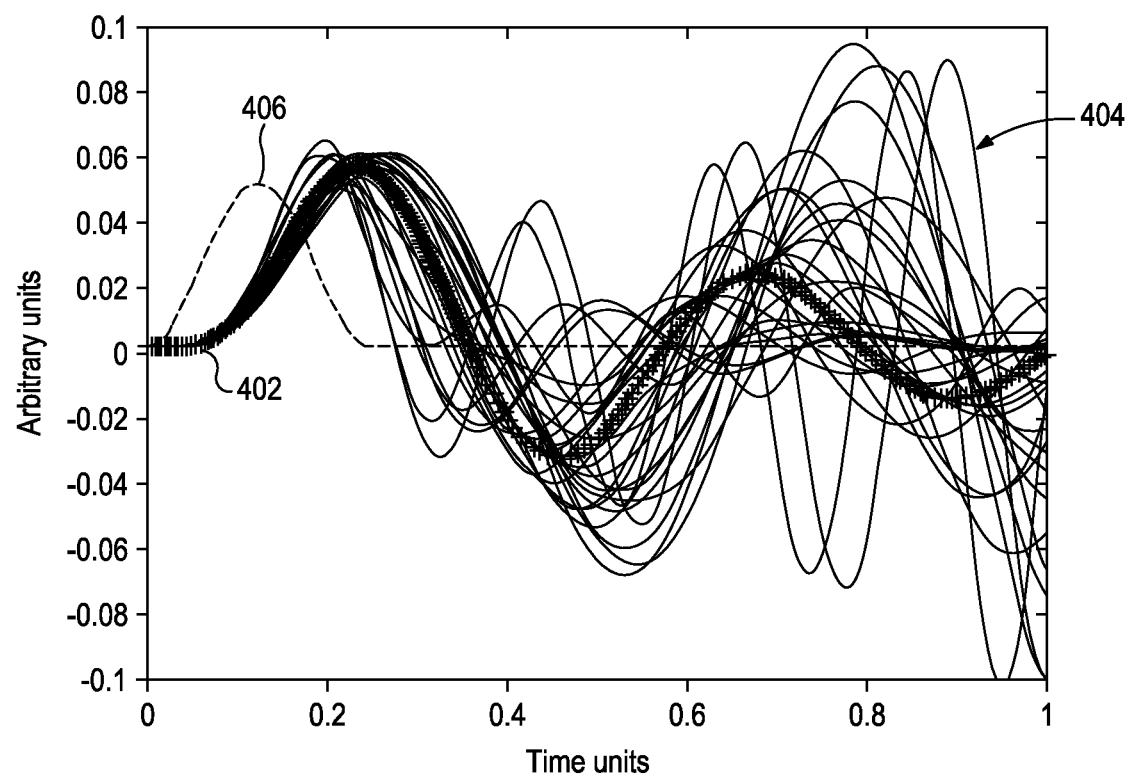
FIG. 2B illustrates the dynamic responses of the sampled models to a disturbance in the absence of a control using the exemplary stochastic control method.

FIG. 2B illustrates the dynamic responses of the sampled models to a disturbance (represented by curve 406) in the absence of the exemplary stochastic control method, according to one or more embodiments disclosed above. The disturbance may represent unexpected wellbore conditions including, but not limited to, change in rock type, changes in mud viscosity, change in temperature, change in friction, and motion of the drill string. It is seen that, although the controlled nominal system (curve 402) stabilizes after the application of the disturbance, the response of the sampled models may become unstable due to the disturbance (as illustrated by curves 404 having increasing magnitudes). The lack of stability in the response of the sampled models indicates the need of considering the system uncertainty when designing the models (and the primary controller 103 of FIG. 1A).

Figure 2C:
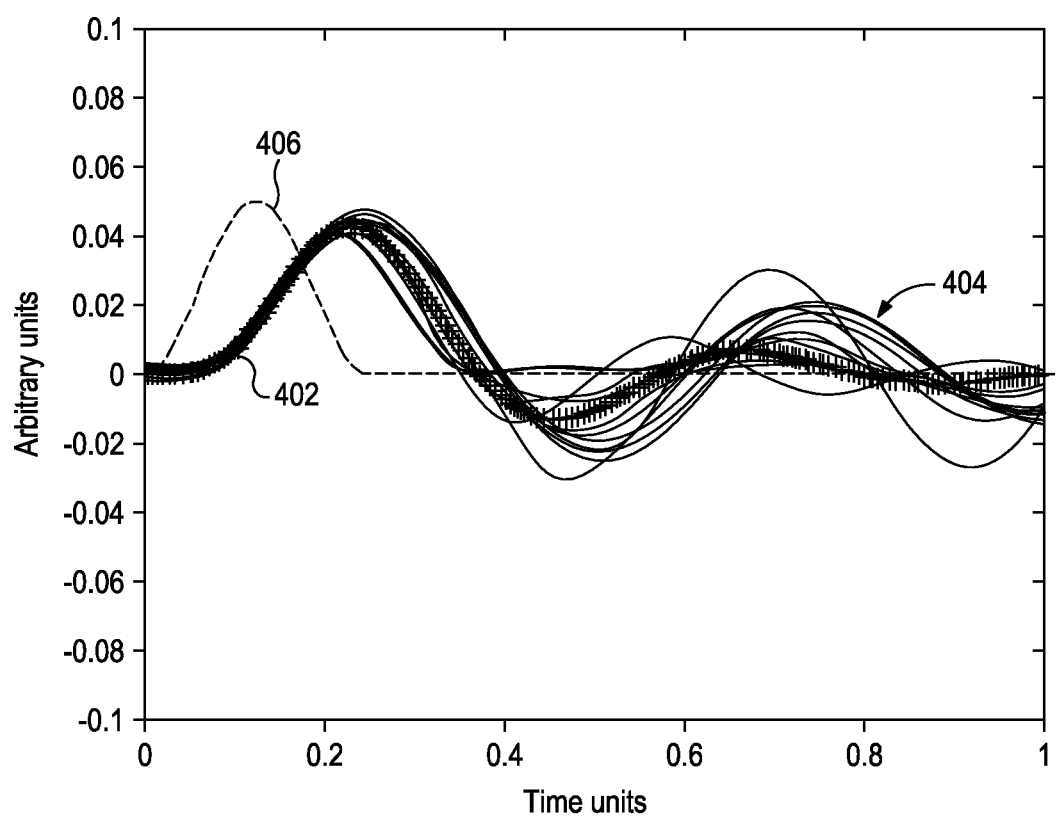
FIG. 2C illustrates the dynamic response of the sampled models to the disturbance in the presence of the exemplary stochastic control methods.
Figure 2D:
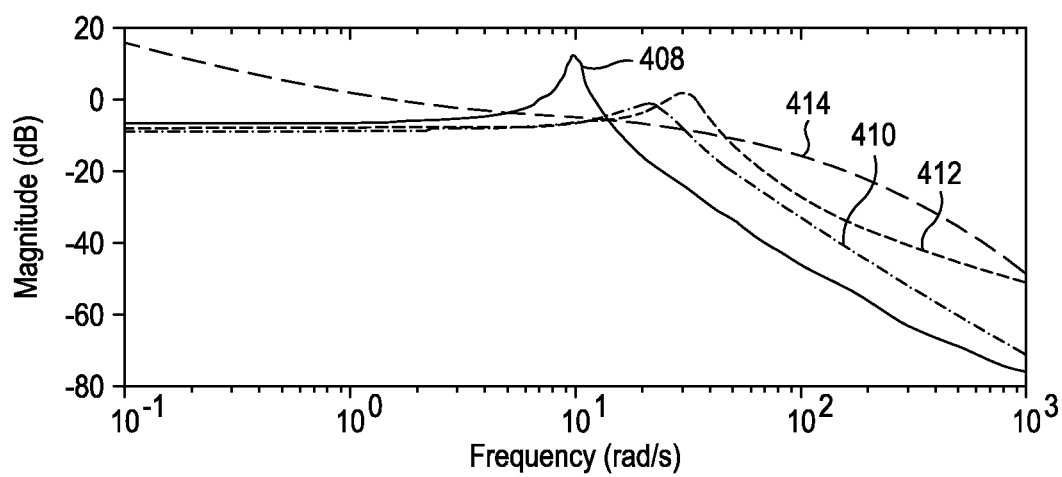
FIG. 2D illustrates magnitude plots of open loop transfer functions of three sampled models.

FIG. 2C illustrates the dynamic response of the sampled models to the disturbance in the presence of the exemplary stochastic control method, according to one or more embodiments disclosed above. As illustrated, the response of the sampled models to the disturbance stabilizes relatively quickly. FIG. 2D illustrates magnitude plots of open loop transfer functions of three sampled models (represented by curves 408, 410, and 412). Each curve 408, 410, and 412 exhibits a peak that may be caused due to one or more disturbances. The controller designed according to the exemplary stochastic control method disclosed above is designed to suppress the peaks such that the resulting closed loop system is stable under uncertainty. The loop transfer function of such a controller is represented by the curve 414. As illustrated, the peaks do not appear in the curve 414, thereby indicating that the impact of the disturbance is suppressed.

As mentioned above, the stochastic control method, according to the one or more embodiments disclosed, can be used in a variety of applications including mud circulation for wellbore drilling operations. As an example, discussed below is the application of the stochastic control method in managed pressure drilling (MPD). In MPD, the downhole pressure or equivalent circulating density (ECD) is regulated within a desired drilling margin. The desired downhole pressure/ECD is achieved by manipulating the flow rate, density, and/or viscosity of the drilling fluid (mud) using a surface mud pump/choke and mud weighting system. However, the actual downhole pressure/ECD is not solely determined by the surface equipment. A variety of disturbances including, but not limited to, a change in temperature, change in friction, and the motion of the drill string, may considerably affect the downhole pressure/ECD. These disturbances severely compromise the controller design (e.g., the controller 302 in FIG. 1A) if not considered during mud circulation operation.

These disturbances may be represented by a stochastic model of the mud circulation system. The stochastic model also accounts for any inaccuracies that may occur due to differences between the modelled mud circulation system and the actual mud circulation system. For example, the temperature model can be constructed as a Gaussian or a Uniform distributed random variable whose mean is the average of measured temperature and whose variance is the variance of the temperature measurements, similarly to a drill string motion disturbance. The disturbances, along with the model inaccuracies, result in a stochastic function including the downhole pressure/ECD as a function of the surface pump pressure, weighting system and choke count. A group of sampled models can be drawn from the stochastic function, and a controller (for instance, the controller 302 in the primary controller 103 in FIG. 1A) that controls the mud pump, choke and/or mud weighting system to reach the desired downhole pressure/ECD can be calculated using a desired stochastic control algorithm. The resulting controller can regulate the downhole pressure with desired measure (merit) and is relatively more tolerant to disturbances and model inaccuracies compared to a controller that is programmed without considering the disturbances.

Figure 3:
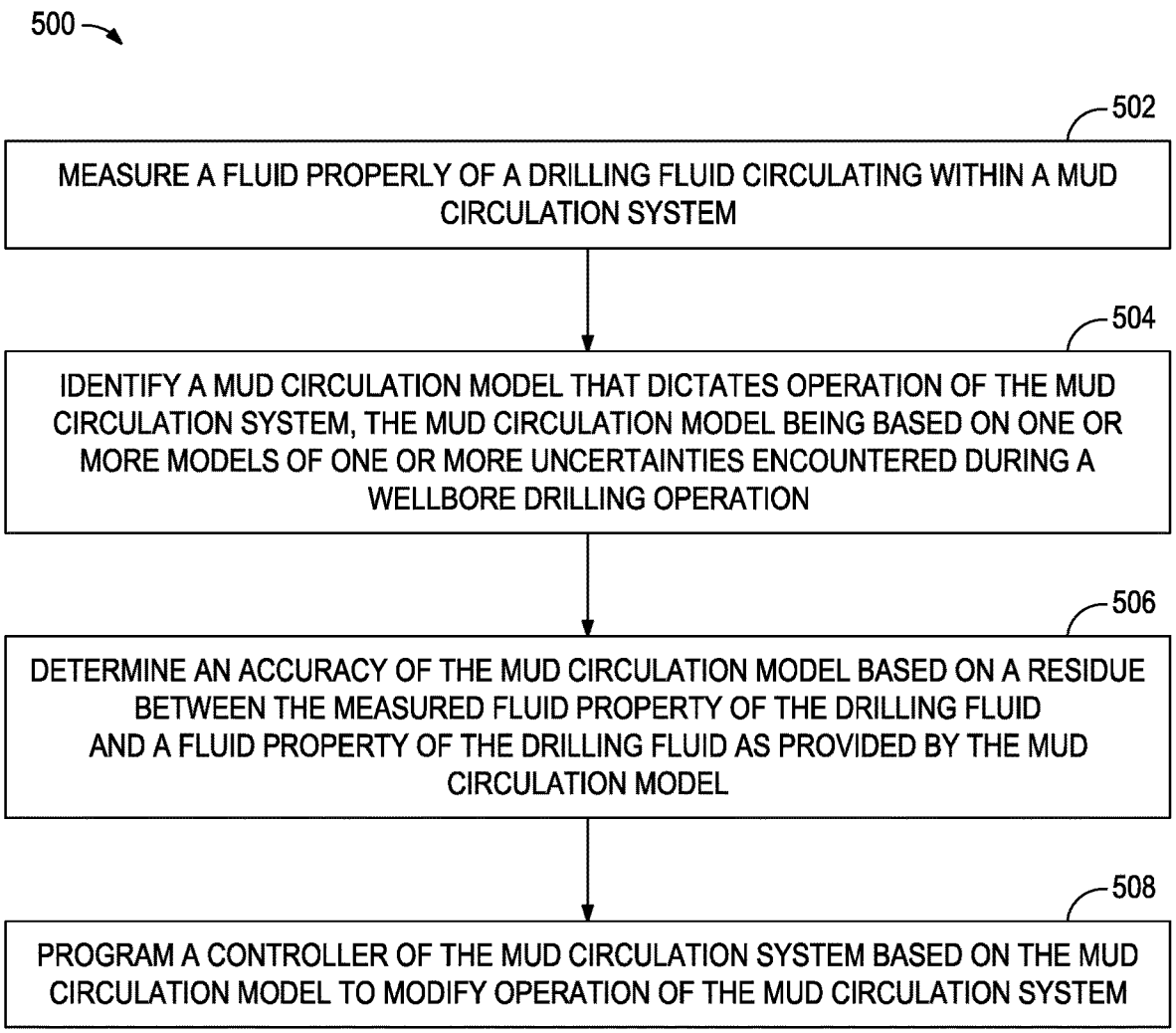
FIG. 3 is a flowchart of a stochastic control method for controlling an operation of a mud circulation system of the well system of FIG. 1A.

FIG. 3 is a flowchart of a stochastic control method 500 for controlling an operation of a mud circulation system of the well system of FIG. 1A. The method 500 includes measuring a fluid property of a drilling fluid circulating within a mud circulation system, as at 502, and identifying a mud circulation model that dictates operation of the mud circulation system, as at 504. The mud circulation model may be based on one or more models of one or more uncertainties encountered during a wellbore drilling operation. The method 500 further includes determining an accuracy of the mud circulation model based on a residue between the measured fluid property of the drilling fluid and a fluid property of the drilling fluid as provided by the mud circulation model, as at 506, and programming a controller of the mud circulation system based on the mud circulation model to modify operation of the mud circulation system, as at 508.

Figure 4:
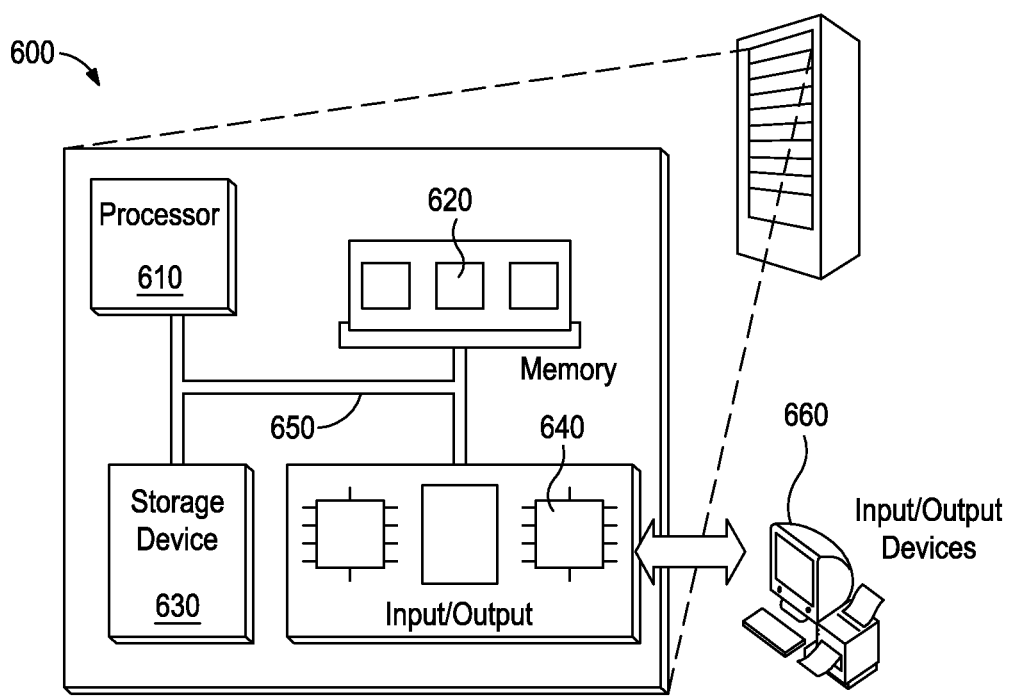
FIG. 4 illustrates an exemplary processing system for configuring and/or controlling the operations of one or more components of the well system of FIG. 1A using the exemplary stochastic control method.

FIG. 4 illustrates an exemplary processing system 600 for configuring and/or controlling the operations of one or more of the primary controller 103, secondary controller 105, and supervisory controller 107 to implement the exemplary stochastic control method according to one or more embodiments disclosed above.

The system 600 may include a processor 610, a memory 620, a storage device 630, and an input/output device 640. Each of the components 610, 620, 630, and 640 may be interconnected, for example, using a system bus 650. The processor 610 may be processing instructions for execution within the system 600. In some embodiments, the processor 610 is a single-threaded processor, a multi-threaded processor, or another type of processor. The processor 610 may be capable of processing instructions stored in the memory 620 or on the storage device 630. The memory 620 and the storage device 630 can store information within the processing system 600.

The input/output device 640 may provide input/output operations for the system 600. In some embodiments, the input/output device 640 can include one or more network interface devices, e.g., an Ethernet card; a serial communication device, e.g., an RS-232 port; and/or a wireless interface device, e.g., an 802.11 card, a 3G wireless modem, or a 4G wireless modem. In some embodiments, the input/output device can include driver devices configured to receive input data and send output data to other input/output devices, e.g., keyboard, printer and display devices 660. In some embodiments, mobile computing devices, mobile communication devices, and other devices can be used.

In accordance with at least some embodiments, the disclosed methods and systems related to scanning and analyzing material may be implemented in digital electronic circuitry, or in computer software, firmware, or hardware, including the structures disclosed in this specification and their structural equivalents, or in combinations of one or more of them. Computer software may include, for example, one or more modules of instructions, encoded on computer-readable storage medium for execution by, or to control the operation of, a data processing apparatus. Examples of a computer-readable storage medium include non-transitory medium such as random access memory (RAM) devices, read only memory (ROM) devices, optical devices (e.g., CDs or DVDs), and disk drives.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing, and grid computing infrastructures.

A computer program (also known as a program, software, software application, script, or code) can be written in any form of programming language, including compiled or interpreted languages, declarative, or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be executed on one computer or on multiple computers that are located at one site or distributed across multiple sites and interconnected by a communication network.

Some of the processes and logic flows described in this specification may be performed by one or more programmable processors executing one or more computer programs to perform actions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors and processors of any kind of digital computer. Generally, a processor will receive instructions and data from a read-only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer may not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD-ROM and DVD-ROM disks. The processor and the memory can be supplemented by, or incorporated in, special purpose logic circuitry.

To provide for interaction with a user, operations may be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hock peer-to-peer networks). A relationship of client and server may arise by virtue of computer programs running on the respective computers and having a client-server relationship to each other.

Embodiments disclosed herein include:

A. A method that includes measuring a fluid property of a drilling fluid circulating within a mud circulation system, identifying a mud circulation model that dictates operation of the mud circulation system, the mud circulation model being based on one or more models of one or more uncertainties encountered during a wellbore drilling operation, determining an accuracy of the mud circulation model based on a residue between the measured fluid property of the drilling fluid and a fluid property of the drilling fluid as provided by the mud circulation model, and programming a controller of the mud circulation system based on the mud circulation model to modify operation of the mud circulation system.

B. A system that includes a mud circulation system for a wellbore drilling operation, a primary controller that controls operation of the mud circulation system, a secondary controller that programs the primary controller, and a computer system including a processor and a non-transitory computer readable medium, the computer system being communicative coupled to the mud circulation system, the primary controller, and the secondary controller and the computer readable medium storing a computer readable program code that when executed by the processor causes the computer system to actuate the secondary controller to: measure a fluid property of a drilling fluid circulating within the mud circulation system, identify a mud circulation model that dictates operation of the mud circulation system, the mud circulation model being based on one or more models of one or more uncertainties encountered during the wellbore drilling operation, determine an accuracy of the mud circulation model based on a residue between the measured fluid property of the drilling fluid and a fluid property of the drilling fluid as provided by the mud circulation model, and program the primary controller based on the mud circulation model to modify operation of the mud circulation system.

Each of embodiments A and B may have one or more of the following additional elements in any combination:

Element 1: further comprising monitoring the drilling fluid at one or more locations in the mud circulation system to measure the fluid property. Element 2: further comprising determining an optimal value of the fluid property of the drilling fluid for use in the mud circulation system, and controlling the mud circulation system based on the optimal value of the fluid property. Element 3: further comprising updating the mud circulation model when the residue is greater than a predetermined threshold value, and programming the controller based on the updated mud circulation model. Element 4: further comprising maintaining the mud circulation model when the residue is less than or equal to a predetermined threshold value. Element 5: further comprising generating a plurality of sampled models, each sampled model being based on the mud circulation model and an uncertainty model of the one or more uncertainties, and programming the controller to modify operation of the mud circulation system based on the plurality of sampled models. Element 6: further comprising determining the accuracy of the mud circulation model using one or more desired statistical test methods. Element 7: further comprising identifying the mud circulation model to operate the mud circulation system based on the measured fluid property.

Element 8: wherein executing the program code further causes the computer system to provide the measured fluid property obtained via monitoring the drilling fluid at one or more locations in the mud circulation system to the secondary controller. Element 9: wherein the system further comprises a supervisory controller superordinate to the primary controller and the secondary controller and executing the program code further causes the computer system to actuate the supervisory controller to determine an optimal value of the fluid property of the drilling fluid for use in the mud circulation system, and control the mud circulation system based on the optimal value of the fluid property. Element 10: wherein executing the program code further causes the computer system to actuate the secondary controller to update the mud circulation model when the residue is greater than a predetermined threshold value, and program the primary controller based on the updated mud circulation model. Element 11: wherein executing the program code further causes the computer system to actuate the secondary controller to maintain the mud circulation model when the residue is less than or equal to a predetermined threshold value. Element 12: wherein executing the program code further causes the computer system to actuate the secondary controller to generate a plurality of sampled models, each sampled model being based on the mud circulation model and an uncertainty model of the one or more uncertainties, and program the primary controller to modify operation of the mud circulation system based on the plurality of sampled models. Element 13: wherein executing the program code further causes the computer system to actuate the secondary controller to determine the accuracy of the mud circulation model using one or more desired statistical test methods. Element 14: wherein executing the program code further causes the computer system to actuate the secondary controller to identify the mud circulation model to operate the mud circulation system based on the measured fluid property.

Embodiment 1: A method, comprising: determining a property of at least one solid present in a drilling fluid circulating within a mud circulation system; identifying a mud circulation model that dictates operation of the mud circulation system, the mud circulation model being based on one or more models of one or more uncertainties encountered during a wellbore drilling operation; determining an accuracy of the mud circulation model based on a difference between the determined property of the at least one solid present in the drilling fluid and a solid property of the drilling fluid as provided by the mud circulation model; and programming a controller of the mud circulation system based on the mud circulation model to modify an operation of the mud circulation system.

Embodiment 2: The method of Embodiment 1, further comprising monitoring the drilling fluid at one or more locations in the mud circulation system to determine the property of the at least one solid.

Embodiment 3: The method of Embodiments 1 or 2, further comprising determining an optimal value of a fluid property of the drilling fluid for use in the mud circulation system based, at least in part, on the determined property of the at least one solid; and controlling the mud circulation system based on the optimal value of the fluid property.

Embodiment 4: The method of any one of Embodiments 1-3, further comprising updating the mud circulation model when a change in the property of the at least one solid property is detected; and programming the controller based on the updated mud circulation model.

Embodiment 5: The method of any one of Embodiments 1-3, further comprising updating the mud circulation model when the difference is greater than a predetermined threshold value; and programming the controller based on the updated mud circulation model.

Embodiment 6: The method of any one of Embodiments 1-5, further comprising generating a plurality of sampled models, each sampled model being based on the mud circulation model and an uncertainty model of the one or more uncertainties; and programming the controller to modify operation of the mud circulation system based on the plurality of the sampled models.

Embodiment 7: The method of any one of Embodiments 1-6, further comprising identifying the mud circulation model to operate the mud circulation system based, at least in part, on the determined property of the at least one solid.

Embodiment 8: The method of any one of Embodiments 1-7, wherein determining the property of the at least one solid comprises determining ingredients of the at least one solid.

Embodiment 9: The method of any one of Embodiments 1-7, wherein determining the property of the at least one solid comprises determining a weight of the at least one solid.

Embodiment 10: The method of any one of Embodiments 1-7, wherein determining the property of the at least one solid comprises determining a rock type of the at least one solid.

Embodiment 11: The method of any one of Embodiments 1-10, wherein the one or more uncertainties comprises a change in a type of rock being drilled, wherein the at least one solid comprises cuttings from the rock.

Embodiment 12: A system comprising a mud circulation system for a wellbore drilling operation; a primary controller that controls operation of the mud circulation system; a secondary controller that programs the primary controller; a processor; and a computer-readable medium having instructions stored thereon that are executable by the processor to cause the processor to actuate the secondary controller to: determine a property of at least one solid in a drilling fluid circulating within the mud circulation system; identify a mud circulation model that dictates operation of the mud circulation system, the mud circulation model being based on one or more models of one or more uncertainties encountered during the wellbore drilling operation; determine an accuracy of the mud circulation model based on a difference between the determined property of the at least one solid and a solid property of the drilling fluid as provided by the mud circulation model; and program the primary controller based on the mud circulation model to modify an operation of the mud circulation system.

Embodiment 13: The system of Embodiment 12, further comprising a supervisory controller superordinate to the primary controller and the secondary controller, wherein the instructions comprise instructions executable by the processor to cause the processor to: actuate the supervisory controller to determine an optimal value of a fluid property of the drilling fluid based, at least in part, on the determined property of the at least one solid; and control the mud circulation system based on the optimal value of the fluid property.

Embodiment 14: The system of Embodiments 12 or 13, wherein the instructions comprise instructions executable by the processor to actuate the secondary controller to: update the mud circulation model in response to the difference being greater than a predetermined threshold value; and program the primary controller based on the updated mud circulation model.

Embodiment 15: The system of Embodiments 12 or 13, wherein the instructions comprise instructions executable by the processor to actuate the secondary controller to maintain the mud circulation model in response to the difference being less than or equal to a predetermined threshold value.

Embodiment 16: The system of any one of Embodiments 12-15, wherein the instructions comprise instructions executable by the processor to actuate the secondary controller to: generate a plurality of sampled models, each sampled model being based on the mud circulation model and an uncertainty model of the one or more uncertainties; and program the primary controller to modify operation of the mud circulation system based on the plurality of sampled models.

Embodiment 17: The system of any one of Embodiments 12-16, wherein the instructions comprise instructions executable by the processor to actuate the secondary controller to identify the mud circulation model to operate the mud circulation system based on the determined property of the at least one solid.

Embodiment 18: An apparatus comprising a processor; and a computer-readable medium having instructions stored thereon that are executable by the processor to cause the processor to actuate a secondary controller of a mud circulation system for a wellbore drilling operation to: determine a property of at least one solid in a drilling fluid circulating within the mud circulation system; identify a mud circulation model that dictates operation of the mud circulation system, the mud circulation model being based on one or more models of one or more uncertainties encountered during the wellbore drilling operation; determine an accuracy of the mud circulation model based on a difference between the determined property of the at least one solid and a solid property of the drilling fluid as provided by the mud circulation model; and program a primary controller of the mud circulation system based on the mud circulation model to modify an operation of the mud circulation system.

Embodiment 19: The apparatus of Embodiment 18, wherein the instructions comprise instructions executable by the processor to cause the processor to: actuate a supervisory controller to determine an optimal value of a fluid property of the drilling fluid based, at least in part, on the determined property of the at least one solid; and control the mud circulation system based on the optimal value of the fluid property.

Embodiment 20: The apparatus of Embodiments 18 or 19, wherein the instructions comprise instructions executable by the processor to actuate the secondary controller to: update the mud circulation model in response to the difference being greater than a predetermined threshold value; and program the primary controller based on the updated mud circulation model.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a"

or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The use of directional terms such as above, below, upper, lower, upward, downward, left, right, uphole, downhole and the like are used in relation to the illustrative embodiments as they are depicted in the figures, the upward direction being toward the top of the corresponding figure and the downward direction being toward the bottom of the corresponding figure, the uphole direction being toward the surface of the well and the downhole direction being toward the toe of the well.

The invention claimed is:

1. A method, comprising:
    determining a property of at least one solid present in a drilling fluid circulating within a mud circulation system;
    identifying a mud circulation model that dictates operation of the mud circulation system, the mud circulation model being based on one or more models of one or more uncertainties encountered during a wellbore drilling operation;
    determining an accuracy of the mud circulation model based on a difference between the determined property of the at least one solid present in the drilling fluid and a solid property of the drilling fluid as provided by the mud circulation model; and
    programming a controller of the mud circulation system based on the mud circulation model to modify an operation of the mud circulation system.

2. The method of claim 1, further comprising monitoring the drilling fluid at one or more locations in the mud circulation system to determine the property of the at least one solid.

3. The method of claim 1, further comprising:
    determining an optimal value of a fluid property of the drilling fluid for use in the mud circulation system based, at least in part, on the determined property of the at least one solid; and
    controlling the mud circulation system based on the optimal value of the fluid property.

4. The method of claim 1, further comprising:
    updating the mud circulation model when a change in the property of the at least one solid property is detected; and
    programming the controller based on the updated mud circulation model.

5. The method of claim 1, further comprising:
    updating the mud circulation model when the difference is greater than a predetermined threshold value; and
    programming the controller based on the updated mud circulation model.

6. The method of claim 1, further comprising:
    generating a plurality of sampled models, each sampled model being based on the mud circulation model and an uncertainty model of the one or more uncertainties; and
    programming the controller to modify operation of the mud circulation system based on the plurality of the sampled models.

7. The method of claim 1, further comprising identifying the mud circulation model to operate the mud circulation system based, at least in part, on the determined property of the at least one solid.

8. The method of claim 1, wherein determining the property of the at least one solid comprises determining ingredients of the at least one solid.

9. The method of claim 1, wherein determining the property of the at least one solid comprises determining a weight of the at least one solid.

10. The method of claim 1, wherein determining the property of the at least one solid comprises determining a rock type of the at least one solid.

11. The method of claim 1, wherein the one or more uncertainties comprises a change in a type of rock being drilled, wherein the at least one solid comprises cuttings from the rock.

12. A system comprising:
    a mud circulation system for a wellbore drilling operation;
    a primary controller that controls operation of the mud circulation system;
    a secondary controller that programs the primary controller;
    a processor; and
    a computer-readable medium having instructions stored thereon that are executable by the processor to cause the processor to actuate the secondary controller to:
        determine a property of at least one solid in a drilling fluid circulating within the mud circulation system;
        identify a mud circulation model that dictates operation of the mud circulation system, the mud circulation model being based on one or more models of one or more uncertainties encountered during the wellbore drilling operation;
        determine an accuracy of the mud circulation model based on a difference between the determined property of the at least one solid and a solid property of the drilling fluid as provided by the mud circulation model; and
        program the primary controller based on the mud circulation model to modify an operation of the mud circulation system.

13. The system of claim 12, further comprising:
    a supervisory controller superordinate to the primary controller and the secondary controller,
    wherein the instructions comprise instructions executable by the processor to cause the processor to:
        actuate the supervisory controller to determine an optimal value of a fluid property of the drilling fluid based, at least in part, on the determined property of the at least one solid; and
        control the mud circulation system based on the optimal value of the fluid property.

14. The system of claim 12, wherein the instructions comprise instructions executable by the processor to actuate the secondary controller to:
    update the mud circulation model in response to the difference being greater than a predetermined threshold value; and program the primary controller based on the updated mud circulation model.

15. The system of claim 12, wherein the instructions comprise instructions executable by the processor to actuate the secondary controller to maintain the mud circulation model in response to the difference being less than or equal to a predetermined threshold value.

16. The system of claim 12, wherein the instructions comprise instructions executable by the processor to actuate the secondary controller to:
generate a plurality of sampled models, each sampled model being based on the mud circulation model and an uncertainty model of the one or more uncertainties; and
program the primary controller to modify operation of the mud circulation system based on the plurality of sampled models.

17. The system of claim 12, wherein the instructions comprise instructions executable by the processor to actuate the secondary controller to identify the mud circulation model to operate the mud circulation system based on the determined property of the at least one solid.

18. An apparatus comprising:
a processor; and
a computer-readable medium having instructions stored thereon that are executable by the processor to cause the processor to actuate a secondary controller of a mud circulation system for a wellbore drilling operation to:
determine a property of at least one solid in a drilling fluid circulating within the mud circulation system;
identify a mud circulation model that dictates operation of the mud circulation system, the mud circulation model being based on one or more models of one or more uncertainties encountered during the wellbore drilling operation;
determine an accuracy of the mud circulation model based on a difference between the determined property of the at least one solid and a solid property of the drilling fluid as provided by the mud circulation model; and
program a primary controller of the mud circulation system based on the mud circulation model to modify an operation of the mud circulation system.

19. The apparatus of claim 18, wherein the instructions comprise instructions executable by the processor to cause the processor to:
actuate a supervisory controller to determine an optimal value of a fluid property of the drilling fluid based, at least in part, on the determined property of the at least one solid; and
control the mud circulation system based on the optimal value of the fluid property.

20. The apparatus of claim 18, wherein the instructions comprise instructions executable by the processor to actuate the secondary controller to:
update the mud circulation model in response to the difference being greater than a predetermined threshold value; and
program the primary controller based on the updated mud circulation model.

\* \* \* \* \*